(12) United States Patent
Taga

(10) Patent No.: US 9,108,393 B2
(45) Date of Patent: Aug. 18, 2015

(54) JOINED STRUCTURE MANUFACTURING METHOD AND JOINED STRUCTURE

(76) Inventor: Yasunori Taga, Aichia (JP)

(*) Notice: Subject to any disclaimer, the term of this patent is extended or adjusted under 35 U.S.C. 154(b) by 499 days.

(21) Appl. No.: 13/057,341

(22) PCT Filed: Jul. 23, 2010

(86) PCT No.: PCT/JP2010/062471
§ 371 (c)(1),
(2), (4) Date: Feb. 3, 2011

(87) PCT Pub. No.: WO2011/010738
PCT Pub. Date: Jan. 27, 2011

(65) Prior Publication Data
US 2011/0256405 A1    Oct. 20, 2011

(30) Foreign Application Priority Data

Jul. 24, 2009   (JP) ................................. 2009-173339

(51) Int. Cl.
*B32B 37/00*   (2006.01)
*B32B 27/06*   (2006.01)
(Continued)

(52) U.S. Cl.
CPC ............... *B32B 37/00* (2013.01); *B32B 17/064* (2013.01); *B32B 27/06* (2013.01); *B32B 27/08* (2013.01); *B32B 27/30* (2013.01); *B32B 27/32* (2013.01); *B32B 27/36* (2013.01); *B32B 2037/0092* (2013.01); *B32B 2307/40* (2013.01);
(Continued)

(58) Field of Classification Search
CPC .......... B32B 9/04; B32B 27/06; B32B 27/08; B32B 27/30; B32B 27/32; B32B 27/36; B32B 37/00; B32B 17/064
USPC ................................. 156/272.2, 275.5, 275.7
See application file for complete search history.

(56) References Cited

U.S. PATENT DOCUMENTS 6,395,124 B1 *   5/2002   Oxman et al. .............. 156/275.5
2002/0145801 A1   10/2002   Tsuchimoto et al.
(Continued)

FOREIGN PATENT DOCUMENTS

CN   1756647 A      4/2006
CN   101391497 A    3/2009
(Continued)

OTHER PUBLICATIONS

International Search Report from priority PCT Application PCT/JP2010/062471 in Japanese, with English translation (3 pages).
(Continued)

*Primary Examiner* — Daniel McNally
(74) *Attorney, Agent, or Firm* — James L. Young; Westman Champlin & Koehler, P.A.

(57) ABSTRACT

The present invention is a method of manufacturing a joined structure formed by joining two joining materials. The method includes a joining medium layer forming step and a joining step. In the joining medium layer step, a joining medium layer is formed on a joining surface of at least one of the two joining materials. The joining medium layer includes one or more of elements selected from a group consisting of hydrogen gas, steam gas, alcohol gas, hydrogen peroxide gas, organometallic compound, and silane coupling agent. In the joining step, the two joining materials arranged one over the other via the joining medium layer are heated and/or irradiated by electromagnetic waves.

12 Claims, 6 Drawing Sheets

(51) Int. Cl.

| | | |
|---|---|---|
| *B32B 27/08* | (2006.01) | |
| *B32B 27/30* | (2006.01) | |
| *B32B 27/32* | (2006.01) | |
| *B32B 27/36* | (2006.01) | |
| *B32B 17/06* | (2006.01) | |
| *G02B 1/10* | (2015.01) | |
| *G02B 5/30* | (2006.01) | |

(52) U.S. Cl.
CPC ..... *B32B2310/0806* (2013.01); *B32B 2457/12* (2013.01); *B32B 2457/20* (2013.01); *G02B 1/105* (2013.01); *G02B 5/3033* (2013.01)

(56) References Cited

U.S. PATENT DOCUMENTS

| | | | |
|---|---|---|---|
| 2003/0189754 A1 | 10/2003 | Sugino et al. | |
| 2008/0160339 A1* | 7/2008 | Ito et al. | 428/688 |
| 2009/0081424 A1* | 3/2009 | Gomi | 428/195.1 |
| 2010/0321779 A1* | 12/2010 | Hane et al. | 359/491 |

FOREIGN PATENT DOCUMENTS

| | | | |
|---|---|---|---|
| JP | 2000241627 | | 9/2000 |
| JP | 2002303725 | | 10/2002 |
| JP | 2002303726 | | 10/2002 |
| JP | 2002303727 | | 10/2002 |
| JP | 2006195320 | | 7/2006 |
| JP | 2008019348 | | 1/2008 |
| JP | 2008019348 A | * | 1/2008 |
| JP | 2008122502 | | 5/2008 |
| WO | 2008078812 | | 7/2008 |
| WO | WO 2008078812 A1 | * | 7/2008 |
| WO | 2008123253 | | 10/2008 |

OTHER PUBLICATIONS

English Translation of the International Preliminary Report on Patentability and Written Opinion dated Feb. 7, 2012 for Corresponding International Application No. PCT/JP2010/062471 including form PCT/IB/338 (1 page), form PCT/IB/373 (1 page), and form PCT/ISA/237 (translation) (4 pages). (6 pages).

Chinese Office Action issued Nov. 4, 2013, Application No. 201080002238.8 (23 pages).

* cited by examiner

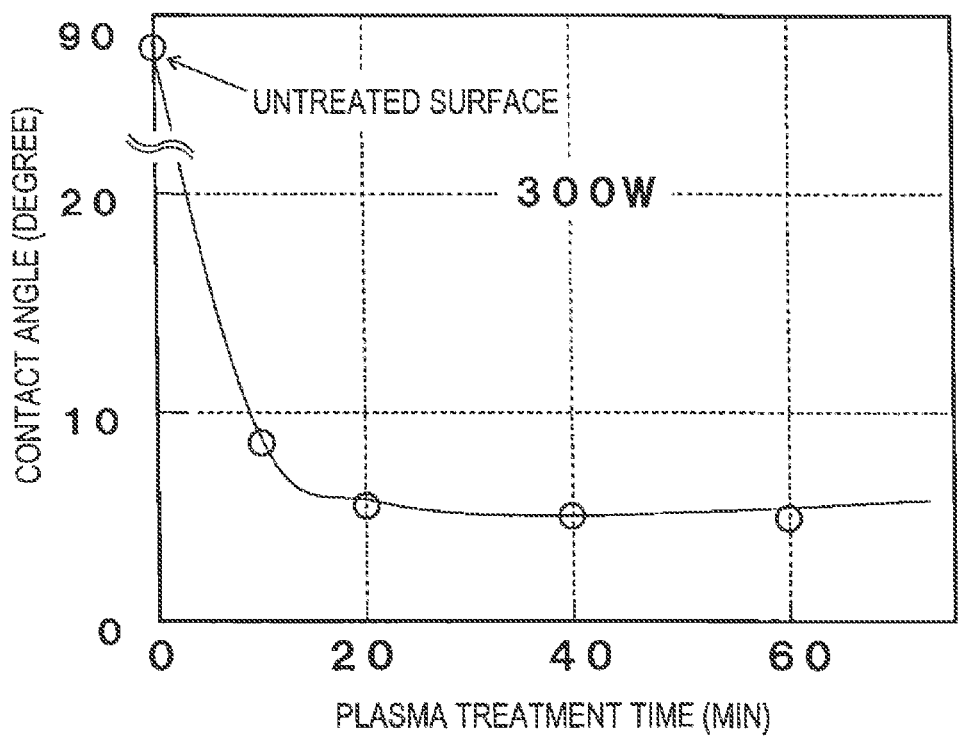

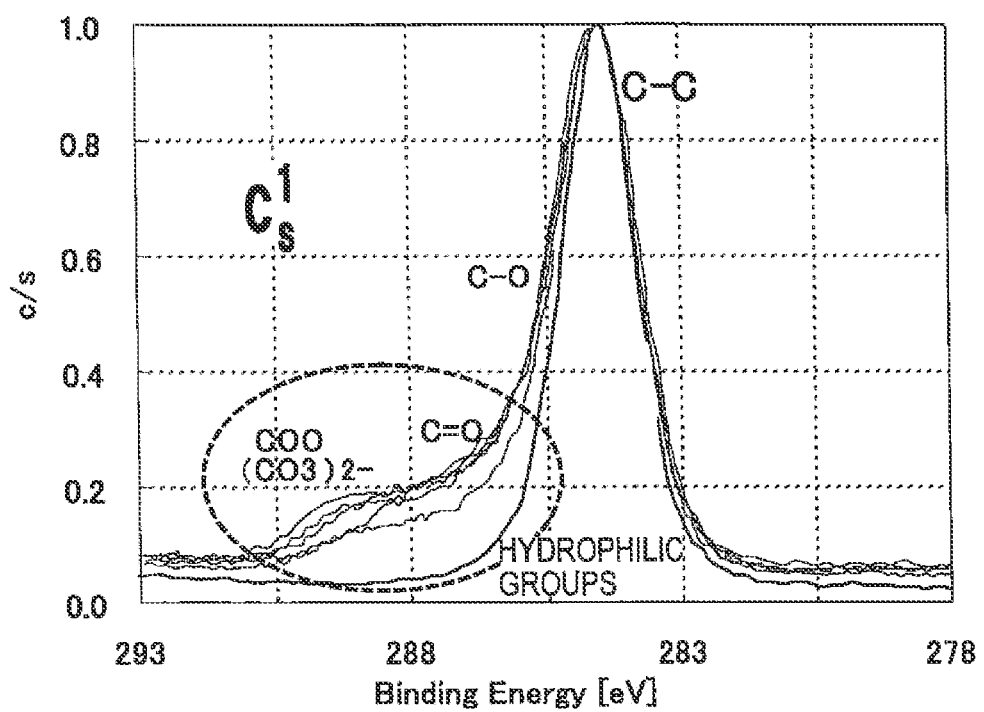

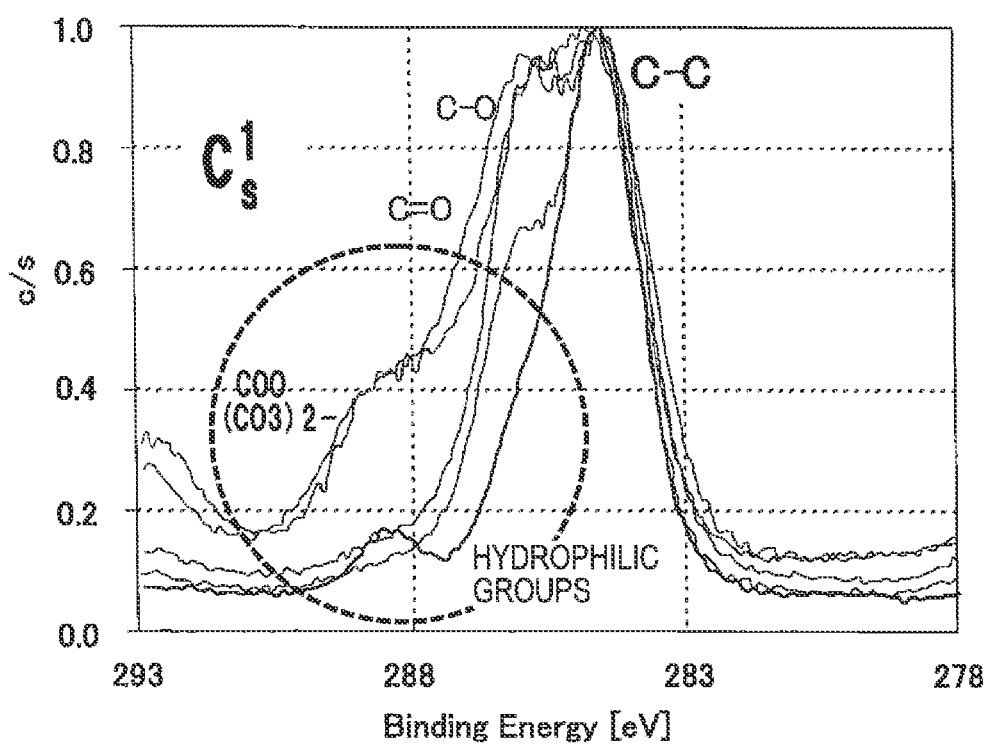

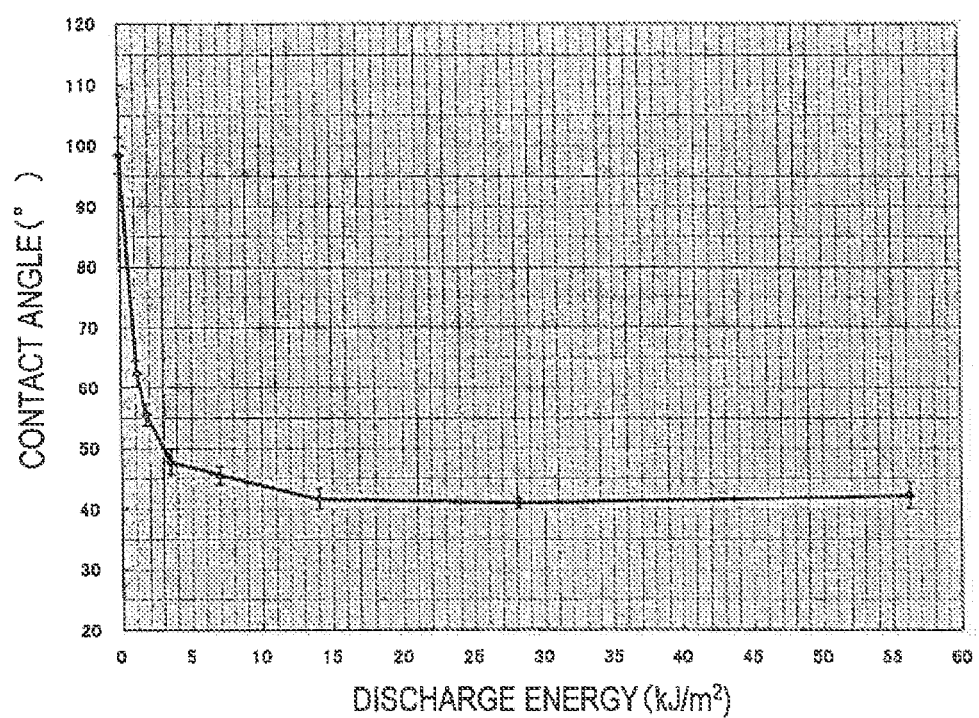

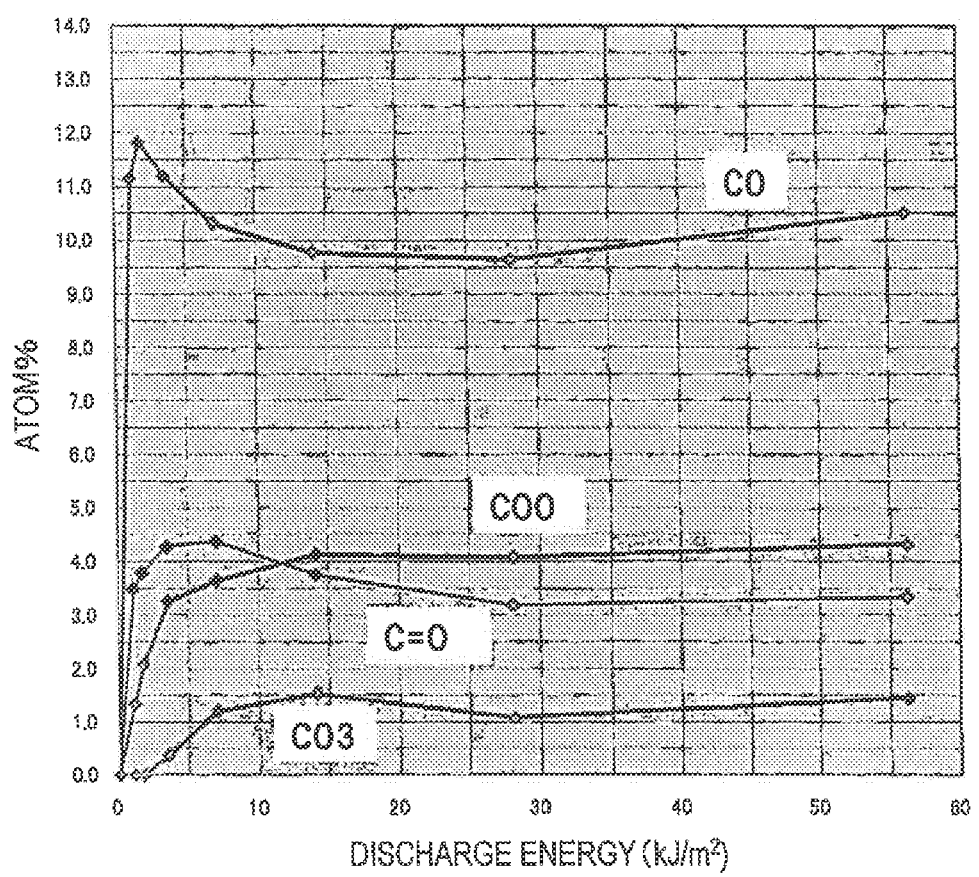

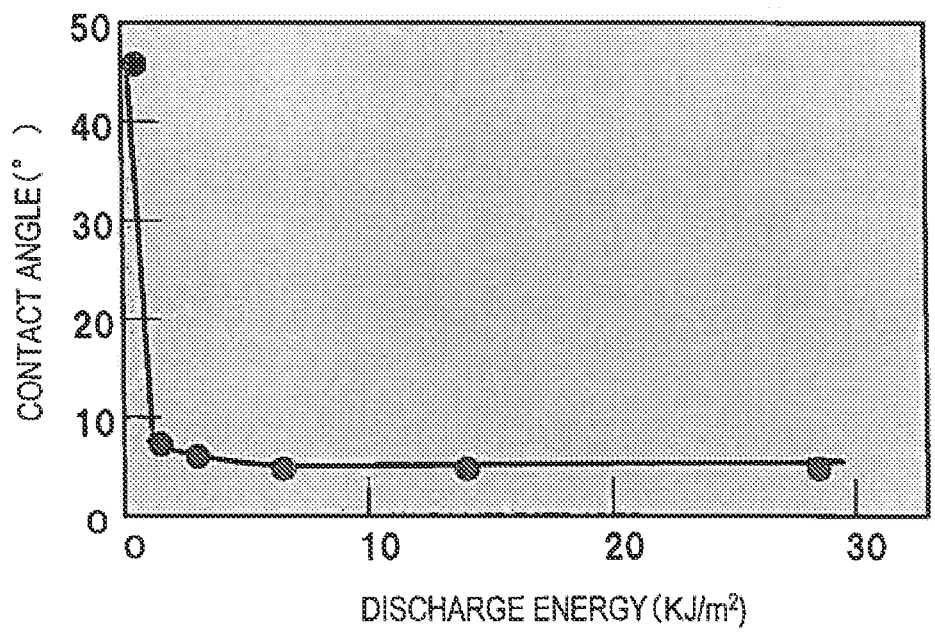

JOINED STRUCTURE MANUFACTURING METHOD AND JOINED STRUCTURE

CROSS REFERENCE TO RELATED APPLICATION

This Application is a Section 371 National Stage Application of International Application No. PCT/JP2010/062471, filed Jul. 23, 2010 and published as WO2011010738 on Jan. 27, 2011, in Japanese, the contents of which are hereby incorporated by reference in their entirety

TECHNICAL FIELD

The present invention relates to a manufacturing method of a joined structure formed by joining two joining materials, and the joined structure.

BACKGROUND

In recent years, there is a strong demand for a change in film substrates of flat panel displays, which are typified by liquid crystal and organic EL displays, and solar cell panels to be thinner, lighter and more flexible than current glass or silicon inorganic material substrates, from the viewpoint of energy conservation and environment conservation.

A liquid crystal display panel is constituted by joining together in a multilayered manner a multitude of functional films with a light management function, in addition to a liquid crystal enclosed between two glass substrates. Examples of such functional films are polarizing films, phase difference films, antireflective films, light control films, protective films, and so on.

In the manufacturing process of the above-described liquid crystal display panel, a joining process is frequently performed in which different types of films made of different materials or having different properties are joined, or in which a glass and a film are joined. However, in general, an organic material film has lower heat resistance than an inorganic material substrate. Thus, a heat process of several hundred degrees is not applicable to the manufacturing process. Accordingly, methods such as application of an adhesive and thermal compression bonding at relatively low temperature are used.

As a conventional technique of joining films together using an adhesive, for example, a technique is disclosed in which a thermoplastic saturated norbornene resin, which received a corona discharge treatment, is joined to a polarizer made of polyvinyl alcohol via a polyester polyol adhesive layer, thereby to form a protection film of a polarizing plate (see Patent Document 1).

Other technique is also disclosed in which a cycloolefin resin film is layered via an adhesive layer on one surface of a polarizer (polarizing film) and a cellulose acetate resin film is layered via an adhesive layer on the other surface of the polarizer, thereby to form a polarizing plate (see Patent Document 2).

On the other hand, a technique is also proposed in which a protection film and a polarizer are joined together without an adhesive therebetween. For example, a technique is disclosed in which a protection film is formed with two layers of resin films having different softening points, and joined to a polarizer on a side of the layer having a lower softening point for thermal compression bonding, thereby to obtain a polarizing plate (see Patent Documents 3 to 5). Also disclosed is a method of manufacturing a polarizing plate by joining a protection film and a polarizer together by heating at a temperature lower than the softening point of the protection film or by irradiation of electromagnetic waves (see Patent Document 6).

PRIOR ART DOCUMENT

Patent Document

Patent Document 1: Unexamined Japanese Patent Publication No. 2000-241627
Patent Document 2: Unexamined Japanese Patent Publication No. 2006-195320
Patent Document 3: Unexamined Japanese Patent Publication No. 2002-303725
Patent Document 4: Unexamined Japanese Patent Publication No. 2002-303726
Patent Document 2: Unexamined Japanese Patent Publication No. 2002-303727
Patent Document 2: Unexamined Japanese Patent Publication No. 2008-122502

SUMMARY OF THE INVENTION

Problem to be Solved by the Invention

If an adhesive is used for joining films together, the adhesive may adversely affect the film properties. For example, if an adhesive is used in manufacturing a polarizing plate, the optical properties and components of the adhesive sometimes affect the polarization degree of the polarizing plate.

Also, a drying process takes longer in the case of using an adhesive. For example, if a cycloolefin resin film having a smaller photoelastic coefficient, which has recently been adopted little by little, is joined to a polarizer with an aqueous adhesive as a protection film, it requires a few days to cure the prepared polarizing plate at a temperature a little higher than a room temperature after joining and drying, in order to achieve a sufficient adhesive force, as indicated in the above Patent Document 2. This further elongates the manufacturing time.

Also, in the method described in the aforementioned Patent Documents 3 to 5, the protection film and the polarizer are joined by thermal compression bonding. Thus, it is necessary to use a resin film having a lower softening point at least on the side to be joined to the polarizer. Further, the heating temperature has to be equal to or higher than the softening point of the resin film which is in contact with the polarizer. Thus, performance shift of the polarizing plate, such as degradation of the polarizer, and so on, may occur.

In Patent Publication 6, joining is achieved at a temperature lower than the softening point of the protection film. However, a sufficient joint strength is not obtained.

As noted above, in the film manufactured by the conventional joining methods, degradation of optical properties occurs by using an adhesive or by heating at a temperature equal to or higher than the softening point of the resin film. Also, a sufficient joint strength is not obtained.

The present invention was made in view of the above-described problems. The object of the present invention is to provide a method of manufacturing a joined structure, and the joined structure, in which a sufficient joint strength is achieved while degradation of optical properties is inhibited.

Means to be Solve the Problem

The present invention in one aspect which was made to solve the above-described problems is a method of manufacturing a joined structure formed by joining two joining materials. The method includes a joining medium layer forming step and a joining step. In the joining medium layer step, a joining medium layer is formed on a joining surface of at least one of the two joining materials. The joining medium layer includes one or more of elements selected from a group consisting of a hydrogen gas, a steam gas, an alcohol gas, a hydrogen peroxide gas, an organometallic compound, and a silane coupling agent. In the joining step, the two joining materials and the joining medium layer are heated and/or irradiated with electromagnetic waves, in a state where the two joining materials are arranged one over the other via the joining medium layer.

In the method of manufacturing a joined structure as above, the hydrogen gas, steam gas, alcohol gas, hydrogen peroxide gas, organometallic compound, and silane coupling agent formed on the joining surface in the joining medium layer step form new joining with each of the two joining materials. Thereby, a joined structure is manufactured which solidly joins the two joining materials.

In the joined structure manufactured by the above-described manufacturing method, degradation of optical properties due to an adhesive does not occur, since the adhesive is not used. Also, heating is performed at relatively low temperature for the material of the above-described joining medium layer to join. Thus, degradation of optical properties in the joining materials due to high-temperature heating can be inhibited. Also, since joining is achieved at low temperature, the joining materials are not limited to a resin having a low softening point.

As noted above, according to the above-described manufacturing method, while degradation of optical properties is inhibited, a joined structure can be manufactured which provides a sufficient joint strength.

The above-noted steam gas forms a water film as a joining medium layer on the joining surfaces of the two joining materials. The steam gas is a steam obtained by changing water into a gas, minute water droplets which fly in the air, or a mixture thereof. It is preferable that the minute water droplets have a diameter of not more than 100 μm in order to favorably form a joining medium layer of a water film (as an ultrathin water film). For the purpose of forming such water droplets, a vaporizer or an ultrasonic humidifier which can form minute water droplets may be used, or a high humidity atmosphere containing a plurality of minute water droplets may be created in a constant humidity tank and a high humidity chamber.

The above-described organometallic compound is formed by binding Si or Ti to an organofunctional group. For application of the organometallic compound to a substrate, various methods can be used such as absorbing the compound after gasified, dipping in or spraying the compound after diluted in a solvent like water, alcohol and others, application by spin coat, and so on. In the method of absorbing the compound after gasified, i.e., in the case of absorbing and applying the evaporated solution compound obtained by binding Si or Ti to an organofunctional group onto a substrate surface, an ultrathin organometallic film of about 2 nm can achieve a higher joint strength. Known examples of the organometallic compound are Si silane coupling agents, tetraethoxyoxysilane (TEOS) and others.

The present invention in a second aspect is characterized in that, in the method of manufacturing a joined structure of the first aspect, the two joining materials are a cycloolefin resin and a glass. The joining medium layer includes a silane coupling agent. The joining step is a heating step.

According to the above method of manufacturing a joined structure, a functional group (e.g., methoxy group, ethoxy group, and so on) that binds chemically to an inorganic material in the silane coupling agent binds to the glass, while a functional group (e.g., vinyl group, epoxy group, amino group, methacryl group, mercapto group and so on) that binds chemically to an organic material binds to the cycloolefin resin. As a result, the glass and the cycloolefin resin are joined to form a joined structure.

The present invention in a third aspect is characterized in that, in the method of manufacturing a joined structure of the second aspect, the joining medium layer is formed by exposing the joining materials to a steam of a silane coupling agent.

According to the above method of manufacturing a joined structure, an ultrathin joining medium layer can be formed by the steam of the silane coupling agent. A high joint strength can be achieved.

The present invention in a fourth aspect is characterized in that, in the method of manufacturing a joined structure of the first aspect, both of the two joining materials are organic compounds. The joining medium layer includes a steam gas or an organometallic compound. The joining step is a heating step.

According to the above method of manufacturing a joined structure, by heating the two joining materials arranged one over the other via the joining medium layer (steam gas or organometallic compound absorbed layer), the joining surfaces of the two joining materials can be joined. This is because heating of the joining medium layer made of organometallic compound and steam gas results in formation of a Si covalent bond (O—Si—O) and a hydrogen bond (H—C) between the contact surfaces of the organic compound joining materials.

The present invention in a fifth aspect is characterized in that, in the method of manufacturing a joined structure of the fourth aspect, the two joining materials are a cycloolefin resin and a polyvinyl alcohol resin.

According to the above method of manufacturing a joined structure, joining between the cycloolefin resin and the polyvinyl alcohol resin can be achieved.

The present invention in a sixth aspect is characterized in that, in the method of manufacturing a joined structure of the first aspect, the two joining materials are one or two elements selected from a group consisting of a cycloolefin resin, a polyethylene terephthalate, and a glass. The joining medium layer includes a steam gas. The joining step is a heating step.

According to the above method of manufacturing a joined structure, joining with one or two elements selected from a group consisting of a cycloolefin resin, a polyethylene terephthalate, and a glass can be achieved.

The present invention in a seventh aspect is characterized in that, in one of the methods of manufacturing a joined structure of the first to sixth aspects, a heating temperature in the joining step is 80° C. to 130° C.

According to the above method of manufacturing a joined structure, the joined structure can be manufactured by heating at a temperature of or lower than 130° C. The joined structure can be manufactured without degradation of properties of the joining materials.

The present invention in an eighth aspect is characterized in that, in the method of manufacturing a joined structure of the first aspect, both of the joining materials are organic compounds. The joining medium layer includes an organometallic compound. The joining step is a step of irradiating electromagnetic waves.

According to the above method of manufacturing a joined structure, irradiation of electromagnetic waves to the joining materials arranged one over the other via the joining medium layer can join the joining surfaces of the two joining materials. This is assumed because irradiation of electromagnetic waves to the joining materials made of organometallic compounds results in formation of a covalent bond between contact surfaces of the joining materials.

Particularly, a breakdown reaction occurs when electromagnetic waves are irradiated to the joining medium layer made of organometallic compound containing Si such as tetraethoxysilane. As a result, an —O—Si—O— bond is formed. Or, a breakdown reaction occurs when electromagnetic waves are irradiated to the joining medium layer made of organometallic compound containing Ti. As a result, a —O—Ti—O— bond is formed.

The present invention in a ninth aspect is characterized in that, in the method of manufacturing a joined structure of the first aspect, the two joining materials are an organic compound and a glass. The joining medium layer includes a steam gas or an alcohol gas. The joining step is a heating step.

According to the above method of manufacturing a joined structure, heating the glass and the organic compound layer via the joining medium layer can join the joining surfaces of the two joining materials. This is assumed because heating of the joining medium layer made of steam gas results in formation of a —C—H—O— bond between the glass and the organic compound.

The present invention in a tenth aspect is characterized in that, in the method of manufacturing a joined structure of the first aspect, the two joining materials are an organic compound and a glass. The joining medium layer includes an organometallic compound. The joining step is a step of irradiating electromagnetic waves.

According to the above method of manufacturing a joined structure, irradiation of electromagnetic waves to the glass and the organic compound layer arranged one over the other via the joining medium layer can join the joining surfaces of the two joining materials. This is assumed because irradiation of electromagnetic waves to the joining medium layer made of the organometallic compound results in formation of a covalent bond between the contact surfaces of the joining materials.

Particularly, a breakdown reaction occurs when electromagnetic waves are irradiated to the joining medium layer made of an organometallic compound containing Si such as tetraethoxysilane. As a result, a —O—Si—O— bond is formed. Or, a breakdown reaction occurs when electromagnetic waves are irradiated to the joining medium layer made of an organometallic compound containing Ti. As a result, a —O—Ti—O— bond is formed.

The present invention in an eleventh aspect is characterized in that, the method of manufacturing a joined structure of one of the first to eighth aspects, further includes a surface treating step prior to the joining medium layer forming step. In the surface treating step, a surface treatment is performed which improves wettability of a surface of at least one of the two joining materials.

According to the above method of manufacturing a joined structure, a contact area between the medium forming layer and the joining surface is increased. Joining in the joining step is promoted. A joint strength can be also increased.

The present invention in a twelfth aspect is characterized in that, in the method of manufacturing a joined structure of the eleventh aspect, the surface treating step is a step of performing one or more of a corona treatment, a plasma treatment, an ozone treatment, and an electromagnetic irradiation treatment.

According to the above method of manufacturing a joined structure, the above-described surface treatment can be appropriately performed by the corona treatment, the plasma treatment, the ozone treatment, and/or the electromagnetic irradiation treatment.

The present invention in a thirteenth aspect is characterized in that, in the method of manufacturing a joined structure of the eleventh aspect, the surface treating step is a step of performing a corona treatment. The joining step is a heating step of 35 minutes or longer.

According to the above method of manufacturing a joined structure, the joined structure can be manufactured which can inhibit detachment of the two joining materials due to a thermal stress when heat is applied to the joined structure.

The present invention in a fourteenth aspect is characterized in that, the method of manufacturing a joined structure of one of the first to thirteenth aspects, further includes a press-holding step which is a step of press-holding the two joining materials arranged one over the other via the joining medium layer, posterior to the joining medium layer forming step.

According to the above method of manufacturing a joined structure, the contact surfaces of the joining materials can be made adjacent by the press-holding step. Thus, joining between the contact surfaces in the joining step can be promoted.

The particular manner of the press-holding step is not specifically limited. For example, press-holding may be performed by a roller, a press, or others. The pressure in the press-holding may be at a degree in which the properties of the joining materials are not damaged.

The press-holding step may be executed prior to the joining step, or may be executed simultaneously with the joining step.

The present invention in a fifteenth aspect is characterized in that, in the method of manufacturing a joined structure of the fourteenth aspect, the press-holding step is a step of heating the two joining materials while press-holding the two joining materials.

According to the above method of manufacturing a joined structure, joining of the contact surfaces of the joining materials can be promoted by conducting thermal compression bonding in the press-holding step.

The present invention in a sixteenth aspect is a joined structure manufactured by joining two materials. The two joining materials are joined by hydrogen bonding or covalent bonding via a metal molecule between surfaces of the two joining materials.

In the above joined structure, since an adhesive is not used, degradation of optical properties due to the adhesive does not occur. Further, since a relatively low temperature is applied to join a steam gas and an organometallic compound in a heating process, degradation of optical properties of the joining materials due to high-temperature heating can be inhibited. Also, since joining is performed at low temperature, the joining materials are not limited to resins having low softening points.

According to the above joined structure, a sufficient joint strength can be obtained while degradation of optical properties is inhibited.

BRIEF DESCRIPTION OF THE DRAWINGS

FIG. 1 is a graph showing a change in contact angle by an oxygen plasma treatment of a ZEONOR surface;

FIG. 2 shows a result of X-ray photoelectron spectroscopy (XPS) analysis showing a state of the ZEONOR surface C which changes by the oxygen plasma treatment;

FIG. 3 shows a result of X-ray photoelectron spectroscopy (XPS) analysis showing a state of a PVA surface C which changes by the oxygen plasma treatment;

FIG. 4 is a graph showing a relation between discharge energy of an atmospheric pressure corona plasma treatment and the contact angle of the ZEONOR surface;

FIG. 5 shows a result of X-ray photoelectron spectroscopy (XPS) analysis showing a state of the ZEONOR surface C which changes by the atmospheric pressure corona plasma treatment; and FIG. 6 is a graph showing a relation between the discharge energy of the atmospheric pressure corona plasma treatment and a water contact angle of a glass surface.

MODE FOR CARRYING OUT THE INVENTION

Embodiments of the present invention are described hereinafter.

<Joining Between PVA Film and Cycloolefin Polymer Film>

A PVA film used in the present invention is formed from polyvinyl alcohol resin. How to make polyvinyl alcohol resin into a film is not specifically limited. Any known manners of film forming can be used.

The manner of producing the polyvinyl alcohol resin is also not specifically limited. The polyvinyl alcohol resin can be obtained by saponifying polyvinyl acetate resin. Examples of polyvinyl acetate resin are polyvinyl acetate which is a homopolymer of vinyl acetate, a copolymer of vinyl acetate and other monomers which can be copolymerized with vinyl acetate, and so on. Examples of the other monomers which can be copolymerized with vinyl acetate are unsaturated carboxylic acids, unsaturated sulfonic acids, olefins, vinyl ethers, acrylamids having an ammonium group, and so on. The degree of saponification of polyvinyl alcohol resin is generally about 85-100 mol %, preferably 98 mol % or higher. The polyvinyl alcohol resin can be further modified. For example, polyvinyl formal and polyvinyl acetal modified with aldehydes can be used. The degree of polymerization of the polyvinyl alcohol resin is generally about 1,000-10,000, preferably about 1,500-5,000.

Film thickness of the PVA film is not specifically limited. If a polarizer in a polarizing plate is formed from the PVA film, the film thickness of about 10 μm to 150 μm can appropriately fulfill a function as a polarizer.

The cycloolefin polymer film used in the present invention is a film made of cycloolefin resin. Cycloolefin resin is a thermoplastic resin having a unit induced from a monomer made of cyclic olefin (cycloolefin) such as norbornene and polycyclic norbornene monomers. The cycloolefin resin can be a ring-opening polymer of the above cycloolefin and a hydrogen-added ring-opening polymer using two or more kinds of cycloolefins. The cycloolefin resin may be an addition copolymer of cycloolefin and an aromatic compound having a chain olefin and a vinyl group. A polar group can be also introduced.

As the commercially available thermoplastic cycloolefin resins, there are "ZEONOR" manufactured by Zeon Corporation, "Topas" sold by Ticona in Germany, "ARTON" sold by JSR Corporation, "ZEONEX" sold by Zeon Corporation, "APEL" sold by Mitsui Chemicals, Inc. and so on (all are product names). The cycloolefin resins as above are formed into a film. Known methods such as solvent casting, melt extrusion, and others are arbitrarily used for film forming. Cycloolefin resin films are also commercially available. The examples of such films are "S-SINA" and "SCA40" sold by Sekisui Chemical Co., Ltd. and "ZEONOR Film" sold by Optes Co., Ltd. and so on (all are product names).

In the present invention, films made of cycloolefin are used since effect of a later-described surface treatment is prominently exhibited. However, other resins may be used. For example, selection of a film made of a resin superior in transparency allows use as a protection film of a polarizing plate. Particular examples of such films are polyesters such as polyethylene terephthalate and polyethylene naphthalate, polyolefins such as polyethylene and polypropylene, cellulosic ester resins such as diacetyl cellulose, triacetyl cellulose and cellulose acetate propionate, polyvinylidene chloride, polycarbonate, cycloolefin resin, polymethylpentene, polyether ketone, polyether sulfone, polysulfone resin, polyether ketone imide, polyamide, acryl resin, and so on.

First Embodiment

In the present embodiment, a polarizing plate which is widely used for a liquid crystal display element was manufactured as an example of a joined structure. Particularly, polyvinyl alcohol film (Poval film manufactured by Kuraray Co., Ltd. having a thickness of 100 μm; hereinafter, simply referred to as a PVA film) selected as a polarizer of the polarizing plate, and a ZEONOR (manufactured by Zeon Corporation) which is a cycloolefin polymer (COP) film selected as a protection film, were joined.

Also, a plurality of product samples of the joined structure were manufactured in different joining conditions. Then, a relation between the joining conditions and the joint strength was investigated.

(1) Surface Treating Step

Here, a surface treatment of the joining materials was performed by a plasma treatment.

The plasma treatment is a process of irradiating plasma, such as inactive gas and oxygen gas generated under reduced pressure or atmospheric pressure, onto a resin surface to activate the surface. Depending on the discharge gaseous species to be used and the input power, hydrophilicity/hydrophobicity (introduction of a hydrophilic group or a hydrophobic group), roughness (irregularity), and chemical activity of a treated surface are largely changed. Thus, prior to the present step, an experiment was performed in order to select a discharge gas to be used.

One of an oxygen gas, a nitrogen gas, and an argon gas was selected as the discharge gas to be used. Then, a hydrophilic state when the selected gas is used was checked per gaseous species. As a result, a hydrophilic treatment using an oxygen gas was found most preferable, although a hydrophilic state was achieved by a plasma treatment using a nitrogen gas or an argon gas. Accordingly, in the present step, a surface treatment by oxygen plasma was performed.

As plasma treatment equipment, a plasma dry cleaner, Model PC-300, manufactured by SAMCO, Inc. was used.

(1.1) Hydrophilic Treatment of ZEONOR Surface

ZEONOR which is made of a cycloolefin polymer is basically a high molecule including a C—H bond. Surface energy of this C—H group is 20 to 40 mN/m, and the water contact angle of the ZEONOR is about 90 degrees. The ZEONOR exhibits hydrophobicity. In order to make this ZEONOR hydrophilic, an oxygen plasma treatment was executed to introduce a hydrophilic group to the ZEONOR surface.

FIG. 1 shows a change in contact angle by the oxygen plasma treatment of the ZEONOR surface. FIG. 2 shows a result of X-ray photoelectron spectroscopy (XPS) analysis showing a state of the ZEONOR surface C which changes by the oxygen plasma treatment. In FIG. 2, a thick line indicates a result of analysis on an untreated state. Other lines indicate a result of analysis on the surface treatment with varying discharge voltage and treatment time.

Referring to FIG. 1, it is found that the oxygen plasma treatment reduced the contact angle of the ZEONOR surface and improved hydrophilicity. Referring to FIG. 2, it is found that the surface treatment newly produced hydrophilic groups of —OH, =CO, —COOH, and so on, in addition to hydrophobic groups of C—C and C—H bonds.

(1.2) Surface Treatment of Polyvinyl Alcohol Film

A PVA film exhibits hydrophilicity with its surface untreated, because an O—H group is constitutionally included in the bulk. Accordingly, the surface treatment of the PVA film was conducted for a secondary purpose of removal of particulate fat or dust adhered to the film surface.

FIG. 3 shows a result of X-ray photoelectron spectroscopy (XPS) analysis showing a state of the PVA film surface C which is changed by the oxygen plasma treatment. Similar to FIG. 2, it is found that the surface treatment newly produced hydrophilic groups of =CO, —COOH, and so on.

(1.3) Measurement of Surface Roughness and Quantity after Oxygen Plasma Treatment Surface roughness Ra of the aforementioned ZEONOR and PVA film was measured. For measurement of the surface roughness Ra, the surfaces were scanned to measure irregularities, using a KEYENCE VN-8010 atomic force microscope (AFM). Then, average Ra values were calculated. As a result, the surface roughness Ra of the ZEONOR is about 1 nm in all manufacturing samples. The surface roughness Ra of the PVA film was varied in a range of 5-20 nm per sample.

The total quantity after the surface treatment of the pair of ZEONOR and PVA film constituting the joined structure was measured per manufacturing sample.

(2) Joining Medium Layer Forming Step

A steam gas was absorbed onto the surfaces of the ZEONOR and the PVA film hydrophilized by the above-described surface treatment, thereby forming a joining medium layer (steam gas absorbed layer; a thin film of water which is referred to simply as a water film hereinafter).

In forming of a joining medium layer, an atomizing sprayer or an ultrasonic humidifier can be used. In the present embodiment, steam gas was sprayed using an ultrasonic humidifier (TUH-A10) manufactured by Toyotomi Co., Ltd. The joining surface was hydrophilized so that atomized steam gas was able to be absorbed onto the surface thinly and uniformly. In the present embodiment, the amount of the steam gas to be absorbed onto the surface was variously changed per manufacturing sample.

(3) Press-Holding Step

After the above-described joining medium layer forming step, each of the surfaces of the PVA film and the ZEONOR is uniformly covered with a water film. Therefore, when the PVA film and the ZEONOR are overlaid, surface tension occurs in the water films, and the PVA film and the ZEONOR attract each other to come close. Here, the PVA film and the ZEONOR were further press-held by a roller so that the surfaces thereof came closer. In the present embodiment, the PVA film and the ZEONOR were press-held at a pressure of 10 Kg/cm$^2$ using a hand roller manufactured by Aluart-Kakoh Co., Ltd.

The quantity after press-holding (quantity of the ZEONOR, the PVA film and the water films) were measured and compared with the quantity measured after the above-described surface treating step. Based on an increase in quantity, the quantity of the water films existing between the joining surfaces of the PVA film and the ZEONOR was calculated. A thickness of a joining medium layer is proportional to its quantity. By measuring the quantity, the thickness can be measured. Here, a number of times and a duration of time to use the aforementioned hand roller were changed. A water volume per unit area of the joining surface was adjusted to one of 0.1 g/cm$^2$, 0.12 g/cm$^2$ and 0.14 g/cm$^2$.

(4) Joining Step

The PVA film and the ZEONOR adjacent via extremely thin water films by the above-described press-holding step were joined by a low temperature heat treatment. Here, the manufacturing samples were left to stand in a constant temperature bath of which temperature was adjusted in advance. Joining was carried out with the temperature for the heat treatment adjusted to one of 50° C., 80° C. and 100° C., and the time for the heat treatment adjusted to one of 1 minute, 5 minutes and 10 minutes.

[Performance Evaluation (Embodiment 1)]

The joint strength of the manufactured joined structures was measured by a peeling test. Joining conditions and results of joint strength evaluation of the manufactured joined structures are shown in TABLE 1. The joint strength was evaluated on a 4-point scale according to a peeling-off force at a boundary between the PVA film and the ZEONOR. The joint strength was also evaluated with respect to those without the surface treating step (described as untreated), and those without the joining medium layer forming step (described as natural absorption).

In the TABLE, a thickness of the joining medium layer was based on the water volume S [mg/cm$^2$] per unit area of the joining surface. If S=0.1 mg/cm$^2$, then the thickness was labeled as "small". If S=0.12 mg/cm$^2$, then the thickness was labeled as "medium". If S=0.14 mg/cm$^2$, then the thickness was labeled as "large". In performance evaluation of the joint strength, the points "4" (<0.001 Kg/mm$^2$), "3" (0.001 to 0.01 Kg/mm$^2$), "2" (0.01 to 0.1 Kg/mm$^2$), and "1" (0.1 Kg/mm$^2$ or larger) were used. The smaller the value in the evaluation, the more favorable the joint strength is. In other words, the joint strength is the highest if evaluated as "1". Next to the highest is "2", then "3", and then "4".

TABLE 1

| | | | joining conditions | | | | | | | | |
|---|---|---|---|---|---|---|---|---|---|---|---|
| | | | 50° C. | | | 80° C. | | | 100° C. | | |
| joining system | plasma treatment condition | thickness of joining medium layer | 1 min. | 5 min. | 10 min. | 1 min. | 5 min. | 10 min. | 1 min. | 5 min. | 10 min. |
| A: ZEONOR B: PVA | untreated | natural absorption | 4 | 4 | 4 | 4 | 4 | 4 | 4 | 4 | 4 |
| | | small | 4 | 4 | 4 | 4 | 4 | 4 | 4 | 4 | 4 |
| | | medium | 4 | 4 | 4 | 4 | 4 | 4 | 4 | 4 | 4 |
| | | large | 4 | 4 | 4 | 4 | 4 | 4 | 4 | 4 | 4 |
| | 100 W 5 min. | natural absorption | 4 | 4 | 4 | 4 | 4 | 3 | 3 | 3 | 3 |
| | | small | 4 | 4 | 4 | 2 | 2 | 1 | 1 | 1 | 1 |
| | | medium | 4 | 4 | 4 | 1 | 1 | 1 | 1 | 1 | 1 |
| | | large | 4 | 4 | 4 | 3 | 3 | 3 | 3 | 3 | 3 |

TABLE 1-continued

| joining system | plasma treatment condition | thickness of joining medium layer | joining conditions ||||||||
| | | | 50° C. ||| 80° C. ||| 100° C. |||
| | | | 1 min. | 5 min. | 10 min. | 1 min. | 5 min. | 10 min. | 1 min. | 5 min. | 10 min. |
|---|---|---|---|---|---|---|---|---|---|---|---|
| | 100 W 10 min. | natural absorption | 4 | 4 | 4 | 3 | 3 | 3 | 3 | 3 | 2 |
| | | small | 4 | 4 | 3 | 2 | 1 | 1 | 1 | 1 | 1 |
| | | medium | 4 | 4 | 3 | 2 | 2 | 2 | 2 | 1 | 1 |
| | | large | 4 | 4 | 3 | 3 | 3 | 3 | 3 | 2 | 2 |

As shown in TABLE 1, when heating in the joining step was carried out at 80° C. or 100° C., a high joint strength was achieved. Especially when the thickness of the joining medium layer was small or medium, a high joint strength was achieved by a short-term low temperature heat treatment.

Those without the oxygen plasma surface treatment could not achieve a high joint strength regardless of the joining conditions. This is considered because there was no sufficient joining area since the untreated ZEONOR surface is hydrophobic.

Embodiment 2

In the present embodiment, a joined structure was manufactured according to the following steps, using the aforementioned ZEONOR and PVA film.

(1) Surface Treating Step

The same step as in the surface treating step in Embodiment 1 was carried out. Conditions of the plasma treatment were 100 W, 10 minutes.

(2) Joining Medium Layer Forming Step

The ZEONOR and PVA film which received the surface treatment were left to stand in a constant temperature constant humidity bath having a temperature of 30° C. and a humidity of 80% for an hour.

(3) Press-Holding Step

The same step as in the press-holding step in Embodiment 1 was carried out.

(4) Joining Step

The same step as in the joining step in Embodiment 1 was carried out. The ZEONOR and PVA film adjacent to each other by the above press-holding step were heat treated at 40° C. for 30 minutes to be joined.

Comparative Example 1

In the present comparative example, a joined structure was manufactured basically according to the same steps as in Embodiment 2, using the aforementioned ZEONOR and PVA film as the joining materials. However, the temperature and humidity of the constant temperature constant humidity bath in the joining medium layer forming step were set to be 30° C. and 30%.

[Performance Evaluation (Embodiment 2 and Comparative Example 1)]

The joint strength of the manufactured joined structure in Embodiment 2 was "1" (0.1 Kg/mm² or larger). On the other hand, the ZEONOR and PVA film in Comparative example 1 could not be joined.

<Joining of Cycloolefin Polymer Film, Polyethylene Terephthalate, and a Glass>

Embodiment 3

In the present embodiment, a joined structure was formed, using a cycloolefin polymer film (ZEONOR) and a polyethylene terephthalate sheet (Lumirror film manufactured by Toray Industries, Inc.; hereinafter, simply referred to as a PET sheet) as the joining materials. A PET sheet in the subsequent embodiments also means this PET sheet.

Basically, the same manufacturing method as in the above Embodiment 1 was used in manufacturing a joined structure. Conditions of the plasma treatment in the surface treating step were 100 W, 10 minutes. The temperature and the duration of the heat treatment were 80° C. and 10 minutes, respectively.

The surface roughness Ra of the ZEONOR after the surface treatment was 1 nm, and the same of the PET sheet after the surface treatment was 1 nm.

Embodiment 4

In the present embodiment, a joined structure was formed by the same manufacturing method as in the above Embodiment 3, using a ZEONOR and a glass as the joining materials. As the glass, EAGLE 2000 glass manufactured by Furuuchi Chemical Corporation was used. A glass in the subsequent embodiments also means this glass.

The surface roughness Ra of the ZEONOR after the surface treatment was 1 nm, and the same of the PET sheet after the surface treatment was 0.5 nm.

Embodiment 5

In the present embodiment, a joined structure was formed by the same manufacturing method as in the above Embodiment 3, using two ZEONORs as the joining materials.

The surface roughness Ra of the respective ZEONORs after the surface treatment was 1 nm.

Embodiment 6

In the present embodiment, a joined structure was formed, using a PET sheet and a glass as the joining materials.

Basically, the same manufacturing method as in the above Embodiment 1 was used in manufacturing a joined structure. Conditions of the plasma treatment in the surface treating step were 50 W, 10 minutes. The temperature and the duration of the heat treatment were 80° C. and 10 minutes, respectively.

The surface roughness Ra of the PET sheet after the surface treatment was 1 nm, and the same of the glass after the surface treatment was 0.5 nm.

Embodiment 7

In the present embodiment, a joined structure was formed by the same manufacturing method as in the above Embodiment 6, using a PET sheet and a ZEONOR as the joining materials.

The surface roughness Ra of the PET sheet after the surface treatment was 1 nm, and the same of the ZEONOR after the surface treatment was 1 nm.

Embodiment 8

In the present embodiment, a joined structure was formed by the same manufacturing method as in the above Embodiment 6, using two PET sheets as the joining materials.

The surface roughness Ra of the respective PET sheets after the surface treatment was 1 nm.

Embodiment 9

In the present embodiment, a joined structure was formed using a glass and a ZEONOR as the joining materials.

Basically, the same manufacturing method as in the above Embodiment 1 was used in manufacturing the joined structure. Conditions of the plasma treatment in the surface treating step were 300 W, 2 minutes. The temperature and the duration of the heat treatment in the joining step were 80° C. and 10 minutes, respectively.

The surface roughness Ra of the glass after the surface treatment was 0.5 nm, and the same of the ZEONOR after the surface treatment was 0.5 nm.

Embodiment 10

In the present embodiment, a joined structure was formed by the same manufacturing method as in the above Embodiment 9, using a glass and a PET sheet as the joining materials.

The surface roughness Ra of the glass after the surface treatment was 0.5 nm, and the same of the PET sheet after the surface treatment was 0.5 nm.

Embodiment 11

In the present embodiment, a joined structure was formed by the same manufacturing method as in the above Embodiment 9, using two glasses as the joining materials.

The surface roughness Ra of the respective glasses after the surface treatment was 0.5 nm.

[Performance Evaluation (Embodiments 3-11)]

Joining conditions of the joined structures manufactured in the above Embodiments 3-11, and results of joint strength evaluation are shown in TABLE 2.

In the TABLE, the thickness of the joining medium layer was based on the water volume S [mg/cm$^2$] per unit area of the joining surface. If S=0.1 g/cm$^2$, then the thickness was labeled as "small". If S=0.12 g/cm$^2$, then the thickness was labeled as "medium". If S=0.14 g/cm$^2$, then the thickness was labeled as "large". In performance evaluation of the joint strength, the points "4" (<0.001 Kg/mm$^2$), "3" (0.001 to 0.01 Kg/mm$^2$), "2" (0.01 to 0.1 Kg/mm$^2$), and "1" (0.1 Kg/mm$^2$ or larger) were used.

As shown in TABLE 2, joining was achieved in all the joining systems of Embodiments 3-11. Specifically, in the systems of ZEONOR-PET sheet, ZEONOR-glass, PET sheet-glass, and PET sheet-PET sheet, joined structures having a strong joint strength of 0.01 Kg/mm$^2$ or larger were manufactured.

Embodiment 12

In the present embodiment, a joined structure was formed by the following steps, using the aforementioned ZEONOR and glass as the joining materials.

(1) Surface Treating Step

To the surface of the ZEONOR, air corona discharge treatment (300 W/V, 10-20 seconds) was conducted. The surface roughness Ra of the ZEONOR was increased from 1 nm to 10 nm by the surface treatment.

To the surface of the glass, oxygen plasma treatment (100 W, 5 minutes) was conducted. The surface roughness Ra of the glass became 0.5 nm.

The total quantity after the surface treatment of a pair of ZEONOR and glass constituting the joined structure was measured per test sample.

(2) Joining Medium Layer Forming Step

The same process as in the joining medium layer forming step of Embodiment 1 was performed.

(3) Press-Holding Step

The same process as in the press-holding step of Embodiment 1 was performed. Also, the quantity after press-holding (quantity of the ZEONOR, the glass and the water films) was measured and compared with the quantity measured after the above-described surface treating step. Based on an increase in quantity, the thickness of a joining medium layer (water volume per unit area) was calculated.

(4) Joining Step

The same process as in the joining step of Embodiment 1 was performed. The ZEONOR and the glass adjacent via extremely thin water films by the press-holding step were joined by a heat treatment at a temperature of 100° C. for 5 minutes.

[Performance Evaluation (Embodiment 12)]

The joint strength of the ZEONOR and the glass was "1" (0.1 Kg/mm$^2$ or larger) when the thickness of the joining medium layer is 0.1 or 0.12 g/cm$^2$, and "2" (0.01 to 0.1 Kg/mm$^2$) when the thickness of the joining medium layer is 0.14 g/cm$^2$. As the joining step (heat treatment) was conducted to those having the thickness of the joining medium layer of 0.14 g/cm$^2$ for further 30 minutes, the joint strength of the ZEONOR and the glass became "1".

TABLE 2

| Embodiment | joining A/B system | | conditions of plasma treatment | | thickness of joining medium layer | joining conditions | | joint strength |
|---|---|---|---|---|---|---|---|---|
| | A | B | power (W) | time (min.) | | temperature (° C.) | time (min.) | |
| Embodiment 3 | ZEONOR | PET sheet | 100 | 10 | medium | 80 | 10 | 2 |
| Embodiment 4 | | glass | 100 | 10 | medium | 80 | 10 | 2 |
| Embodiment 5 | | ZEONOR | 100 | 10 | medium | 80 | 10 | 3 |
| Embodiment 6 | PET sheet | glass | 50 | 10 | medium to large | 80 | 10 | 1 |
| Embodiment 7 | | ZEONOR | 50 | 10 | medium to large | 80 | 10 | 2 |
| Embodiment 8 | | PET sheet | 50 | 10 | medium to large | 80 | 10 | 1 |
| Embodiment 9 | glass | ZEONOR | 300 | 2 | small | 80 | 10 | 2 |
| Embodiment 10 | | PET sheet | 300 | 2 | small | 80 | 10 | 1 |
| Embodiment 11 | | glass | 300 | 2 | small | 80 | 10 | 3 |

When these joined structures are soaked in warm water of 60° C. for four hours, those which have the joining medium layer thickness of 0.14 g/cm² and are heat treated for 30 minutes longer are difficult to peel off, as compared to those having the joining medium layer thickness of 0.1 or 0.12 g/cm². Stable joining was maintained.

The ZEONOR and glass, which received a normal oxygen plasma treatment without an air corona discharge treatment, were joined by the same manufacturing method as in the Embodiment 12. Then, the joint strength of the joined structure became "1". When this joined structure was soaked in warm water of 60° C. for 30 minutes, the joint strength was reduced.

As above, those which received the air corona discharge treatment and which received the long-term heat treatment with increased surface roughness had a stronger peel resistance to thermal stress.

Embodiment 13

In the present embodiment, ZEONOR (manufactured by Zeon Corporation) which is a cycloolefin polymer (COP) film was selected and joined with a glass plate, as an example of a joined structure.

(1) Surface Treating Step

Here, a surface treatment of the joining materials was conducted by a corona plasma treatment (corona treatment). Particularly, a corona plasma produced by applying high pressure between a metal electrode and a dielectric body under atmospheric pressure was irradiated to the resin surface and glass surface, so as to activate the surfaces.

Corona plasma treatment conditions under atmospheric pressure were as follows.

Corona treater: a large-size experimental device for linear corona treatment made by Kasuga Electric Works Ltd.

Treatment conditions: 150 W output, 0.5 m/min scanning speed, 1 mm distance between electrode and substrate Plasma irradiation power (discharge energy [KJ/m²]) was calculated from the output and the scanning speed.

(1.1) Hydrophilic Treatment of ZEONOR Surface

ZEONOR which is constituted from a cycloolefin polymer is basically a high molecule including a C—H bond. Surface energy of this C—H group is 20 to 40 mN/m, and the water contact angle of the ZEONOR is about 90 degrees. The ZEONOR exhibits hydrophobicity. In order to make this ZEONOR hydrophilic, an atmospheric pressure corona plasma treatment was executed to introduce a hydrophilic group to the ZEONOR surface.

FIG. 4 shows a relation between the water contact angle of the ZEONOR surface and the discharge energy in the corona plasma treatment. FIG. 5 shows a change in functional group component on the ZEONOR surface C which changes by the atmospheric pressure corona plasma treatment. The functional group component on the ZEONOR surface C was found from the X-ray photoelectron spectroscopy (XPS) spectrum as in Embodiment 1 (FIG. 2).

Referring to FIG. 4, it is found that the corona plasma treatment reduced the contact angle of the ZEONOR surface and improved hydrophilicity. The contact angle of the ZEONOR surface becomes constant around 40° when the irradiated discharge energy exceeds a certain value. Also referring to FIG. 5, it is found that the surface treatment newly produced hydrophilic groups of OH, C=O, —CO₃, and so on, in addition to hydrophobic groups of C—C and C—H bonds.

In the present embodiment, corona plasma irradiation was carried out at a discharge energy of 15 kJ/m². The contact angle of the ZEONOR surface was about 40°.

(1.2) Change in Hydrophilicity on Glass Surface

FIG. 6 shows a relation between the water contact angle of the glass surface and the discharge energy in the corona plasma treatment. It is found that, as the discharge energy increases, the contact angle of the glass surface rapidly decreases, and the glass surface comes into a superhydrophilic state having a contact angle of around 5°.

In the present embodiment, corona plasma irradiation was carried out at a discharge energy of 15 kJ/m². The contact angle of the glass surface was about 5°.

(1.3) Change in Surface Roughness on Atmospheric Pressure Corona Plasma Treated Surface Surface roughness Ra of the aforementioned ZEONOR and glass after the surface treatment was measured. For measurement of the surface roughness Ra, a KEYENCE VN-8010 atomic force microscope (AFM) was used. The surfaces were scanned to measure irregularities. Then, average Ra values were calculated. As a result, the surface roughness Ra of the ZEONOR is about 1 nm in all manufacturing samples. The surface roughness Ra of the glass was 0.1 nm.

(2) Joining Medium Layer Forming Step

To the surfaces of the ZEONOR and glass which were hydrophilized by the above surface treatment, an ornagometallic compound was applied as the joining medium layer. In the present embodiment, a silane coupling agent was used as the organometallic compound. The silane coupling agent is a compound made of organic material and silicon, with a molecular structure consisting of two or more types of different reactive groups. One type of the reactive group is chemically combined with inorganic material (glass, ceramics, metal, and so on), and the other type of the reactive group is chemically combined with organic material (vinyl group, epoxy group, methacryl group, mercapto group, olefin group, and so on). Accordingly, the silane coupling agent is widely used as an adhesive which binds organic material and inorganic material which are generally difficult to bind.

The used silane coupling agents are 3-aminopropyltrimethoxysilane (manufactured by Shin-Etsu Chemical Co., Ltd., KBM903) and 3-glycidoxypropyltrimethoxysilane (manufactured by Shin-Etsu Chemical Co., Ltd., KBM403). The details of the molecular structures of these silane coupling agents are shown in TABLE 3.

TABLE 3

| KBM903 (manufactured by Shin-Etsu Chemical Co., Ltd.) | KBM403 (manufactured by Shin-Etsu Chemical Co., Ltd.) |
|---|---|
| 3-aminopropyltrimethoxysilane | 3-glycidoxypropyltrimethoxysilane |
| $(CH_3O)_3SiC_3H_6NH_2$ |  |

In the silane coupling agent, a hydrolizable group such as —OCH$_3$, —OC$_2$H$_5$, —OCOCH$_3$, is hydrolyzed to yield silanol (Si—OH), which is partially condensed to form a silane oligomer and is absorbed onto the surface of the inorganic material by hydrogen bonding, to form a strong O—Si—O covalent bond by the subsequent dehydration/condensation reaction. As for the reaction and interaction with an organic substrate, there are mechanisms such as reaction between a side chain of the organic material and a terminal functional group (amino group, epoxy group, methacryl group, vinyl group, mercapto group, and so on), graft polymerization reaction to a main chain, co-reaction, compatibilization to the organic material, and interpenetration.

Silane coupling coating to the glass and ZEONOR film surfaces hydrophilized in the above-described surface treating step was conducted according to the following steps. The surface treated glass substrate was exposed to the steam of the evaporated silane coupling agent (KBM903) for 30 minutes. Particularly, the silane coupling agent (liquid) was placed on the bottom of a sealed glass container. The glass substrate was set on a mesh shelf board and the glass container was sealed. In the same manner, the surface treated ZEONOR film was exposed to the steam of the silane coupling agent (KBM403) for 30 minutes.

The film thickness of the organic silane coupling films absorbed onto the glass and ZEONOR films by the exposure is considered to be about 2 nm or lower (A. Hozumi, K. Uchiyama, H. Sugimura and O. Takai, Langmuir 15, 7600 (1999)).

(3) Press-Holding Step (Thermal Compression Bonding Step)

In the present embodiment, prior to the heat treatment in the later-described joining step, the manufacturing samples were press-held and heated (heat pressed).

The glass and ZEONOR on which the silane coupling agent was coated by the above joining medium layer forming step were press joined by an electrothermal press. Joining conditions were such that the temperature was 130° C., the pressure was 6 MPa, and the time was 5 minutes.

Steam in the atmosphere was absorbed onto the corona plasma treated surfaces of the glass and ZEONOR. It is assumed that, with the steam, the silane coupling agent is hydrolyzed, and formation of silanol gradually proceeds. It is considered that the silanol forms a covalent bond by dehydration/condensation reaction in the thermal compression bonding step.

Absorption of the steam onto the corona plasma treated surface can be natural absorption from a gas phase. In addition, an atomizing sprayer or an ultrasonic humidifier can be used.

(4) Joining Step (Heating Step)

Further heat treatment was carried out to the joined body of the glass and ZEONOR to achieve a more reliable joined state. Here, the manufacturing samples (which indicate joined structures prior to completion of all steps; the same is applied to other embodiments as well) of the glass and ZEONOR were left to stand in a constant temperature bath for 5 minutes. The temperature inside the constant temperature bath was pre-adjusted to 130° C.

With the above-described steps, the joined structure made of the glass and ZEONOR was manufactured.

Embodiment 14

In the present embodiment, a joined structure was manufactured basically with the same joining materials according to the same steps as Embodiment 13, except that only the glass was coated with KBM903 and coating of the ZEONOR with the silane coupling agent was not carried out in the joining medium layer forming step.

Embodiment 15

In the present embodiment, a joined structure was manufactured which is made of the glass and ZEONOR.

(1) Surface Treating Step

A surface treatment was conducted by an atmospheric pressure corona plasma treatment (corona treatment) to the ZEONOR. The contact angle of the ZEONOR surface was adjusted to about 40°.

A surface treatment was conducted by an atmospheric pressure glow plasma treatment to the glass. Conditions of the plasma treatment were as follows.

Plasma treater: plasma dry cleaner, Model PC-300, manufactured by Samco. Inc.

Treatment conditions: 220 L/min of N$_2$ discharge gas, 150 kW power, 1.5 m/min×2 conveyance speed, 2 mm distance between electrode and substrate By the above atmospheric pressure glow plasma treatment, the contact angle of the glass was adjusted to about 5°.

(2) Joining Medium Layer Forming Step

In the present embodiment, similar to Embodiment 13, the surface treated glass substrate was exposed to the steam of the evaporated silane coupling agent (KBM903) for 15 minutes. Also, the surface treated ZEONOR film was exposed to the steam of the silane coupling agent (KBM403) for 15 minutes.

(3) Press-Holding Step

The glass and ZEONOR coated with the silane coupling agents in the above-described joining medium layer forming step were press-held, under a reduced-pressure environment (about 500 Torr) and at a room temperature (25° C.), at a pressure of 10 Kg/cm$^2$ using a hand roller manufactured by Aluart-Kakoh Co., Ltd.

(4) Joining Step (Heating Step)

Further heat treatment was carried out to the glass and ZEONOR to which the above-described press-holding step was performed, to form a more reliable joining state. Here, the manufacturing samples of the glass and ZEONOR were left to stand in a constant temperature bath for 3 minutes. The temperature inside the constant temperature bath was pre-adjusted to 130° C.

According to the aforementioned steps, a joined structure made of the glass and ZEONOR was manufactured.

Embodiment 16

In the present embodiment, a joined structure was manufactured basically with the same joining materials according to the same steps as Embodiment 15, except that only the glass was coated with KBM903 and coating of the ZEONOR with the silane coupling agent was not carried out in the joining medium layer forming step.

Embodiment 17

In the present embodiment, a joined structure was manufactured basically with the same joining materials according to the same steps as Embodiment 15, except that only the glass was coated with KBM403 and coating of the ZEONOR with the silane coupling agent was not carried out in the joining medium layer forming step.

Embodiment 18

In the present embodiment, a joined structure made of the glass and ZEONOR was manufactured.

(1) Surface Treating Step

A surface treatment by an atmospheric pressure corona plasma treatment was conducted to the ZEONOR and glass. The contact angle of the ZEONOR surface was adjusted to about 40°, and the same of the glass was adjusted to about 5°.

(2) Joining Medium Layer Forming Step

In the present embodiment, similar to Embodiment 13, the surface treated glass substrate was exposed to the steam of the evaporated silane coupling agent (KBM903) for 15 minutes. Also, the surface treated ZEONOR film was exposed to the steam of the silane coupling agent (KBM403) for 15 minutes.

(3) Press-Holding Step

The glass and ZEONOR coated with the silane coupling agents in the above-described joining medium layer forming step were press-held, under an atmospheric pressure environment (about 760 Torr) and at a room temperature (25° C.), at a pressure of 10 Kg/cm$^2$ using a hand roller manufactured by Aluart-Kakoh Co., Ltd.

(4) Joining Step (Heating Step)

Further heat treatment was carried out to the glass and ZEONOR to which the above-described press-holding step was performed, to form a more reliable joining state. Here, the manufacturing samples of the glass and ZEONOR were left to stand in a constant temperature bath for 3 minutes. The temperature inside the constant temperature bath was pre-adjusted to 130° C.

According to the aforementioned steps, a joined structure made of the glass and ZEONOR was manufactured.

Embodiment 19

In the present embodiment, a joined structure was manufactured basically with the same joining materials according to the same steps as Embodiment 18, except that only the glass was coated with KBM903 and coating of the ZEONOR with the silane coupling agent was not carried out in the joining medium layer forming step.

Embodiment 20

In the present embodiment, a joined structure was manufactured basically with the same joining materials according to the same steps as Embodiment 18, except that coating of the glass and ZEONOR with the silane coupling agent was not carried out.

Embodiment 21

In the present embodiment, a joined structure made of the glass and ZEONOR was manufactured.

(1) Surface Treating Step

A surface treatment by a reduced pressure glow plasma treatment was conducted to the ZEONOR and glass. Conditions of the plasma treatment were as follows.

Plasma treater: plasma dry cleaner, Model PC-300, manufactured by Samco. Inc.

Discharge gas: N$_2$, 220 L/min

Output power (glass): 300 W, 2 minutes

Output power (ZEONOR): 100 W, 10 minutes

By the above reduced pressure glow plasma treatment, the contact angle of the ZEONOR surface was adjusted to about 40°, and the same of the glass was adjusted to about 5°.

(2) Joining Medium Layer Forming Step

The steam gas was absorbed onto the surface of the ZEONOR and glass hydrophilized by the above-described surface treatment so that a joining medium layer is formed. Absorption of the steam gas was achieved by natural absorption for 30 minutes, under an environment with a room temperature of 25° C. and a humidity of 50%. In the present embodiment, exposure to a silane coupling agent was not carried out.

(3) Press-Holding Step

The glass and ZEONOR absorbing the steam gas in the above-described joining medium layer forming step were press-held, under an atmospheric pressure environment (about 760 Torr) and at a room temperature, at a pressure of 10 Kg/cm$^2$ using a hand roller manufactured by Aluart-Kakoh Co., Ltd.

(4) Joining Step (Heating Step)

Further heat treatment was carried out to the glass and ZEONOR to which the above-described press-holding step was performed, to form a more reliable joining state. Here, the manufacturing samples of the glass and ZEONOR were left to stand in a constant temperature bath for 10 minutes. The temperature inside the constant temperature bath was pre-adjusted to 80° C.

According to the aforementioned steps, a joined structure made of the glass and ZEONOR was manufactured.

Embodiment 22

In the present embodiment, a joined structure was manufactured basically with the same joining materials according to the same steps as Embodiment 20, except that no heat treatment was carried out in the joining step, and the samples were left to stand at normal temperature for 30 minutes.

[Performance Evaluation (Embodiments 13-22)]

Joint strength of the joined structures manufactured in the above Embodiments 13-22 was measured by a peeling test. Joining conditions and results of joint strength evaluation are shown in TABLE 4.

Joint strength was measured for both samples with and without a moisture resistance test. In the moisture resistance test, the samples were left to stand under an environment having a temperature of 60° C. and a humidity of 90%, for 470 hours. Those without the moisture resistance test were left to stand under an environment having a temperature of 25° C. and a humidity of 50%, for 470 hours. In evaluation of the joint strength, the points "4" (<0.001 Kg/mm$^2$), "3" (0.001 to 0.01 Kg/mm$^2$), "2" (0.01 to 0.1 Kg/mm$^2$), and "1" (0.1 Kg/mm$^2$ or larger) were used.

TABLE 4

| Embodiment | joining surface treatment | | silane coupling exposure condition | | joining method | heating step | joint strength | |
| | glass | ZEONOR | glass | ZEONOR | (nipping step) | (joining step) | 25° C., 50% | 60° C., 90% |
|---|---|---|---|---|---|---|---|---|
| Embodiment 13 | atmospheric pressure corona plasma | atmospheric pressure corona plasma | KBM903 | KBM403 | atmospheric thermoelectric joining | 130° C., 5 min. | 1 | 1 |

TABLE 4-continued

| Embodiment | joining surface treatment | | silane coupling exposure condition | | joining method (nipping step) | heating step (joining step) | joint strength 25° C., 50% | 60° C., 90% |
|---|---|---|---|---|---|---|---|---|
| | glass | ZEONOR | glass | ZEONOR | | | | |
| Embodiment 14 | atmospheric pressure corona plasma | atmospheric pressure corona plasma | KBM903 | none | atmospheric thermoelectric joining | 130° C., 5 min. | 1 | 1 |
| Embodiment 15 | atmospheric pressure glow plasma | atmospheric pressure corona plasma | KBM903 | KBM403 | reduced pressure joining | 130° C., 3 min. | 1 | 1 |
| Embodiment 16 | atmospheric pressure glow plasma | atmospheric pressure corona plasma | KBM903 | none | reduced pressure joining | 130° C., 3 min. | 1 | 4 |
| Embodiment 17 | atmospheric pressure glow plasma | atmospheric pressure corona plasma | KBM403 | none | reduced pressure joining | 130° C., 3 min. | 1 | 4 |
| Embodiment 18 | atmospheric pressure corona plasma | atmospheric pressure corona plasma | KBM903 | KBM403 | atmospheric joining | 130° C., 10 min. | 1 | 2 |
| Embodiment 19 | atmospheric pressure corona plasma | atmospheric pressure corona plasma | KBM903 | none | atmospheric joining | 130° C., 10 min. | 1 | 2 |
| Embodiment 20 | atmospheric pressure corona plasma | atmospheric pressure corona plasma | none | none | atmospheric joining | 130° C., 10 min. | 1 | 4 |
| Embodiment 21 | reduced pressure glow plasma | reduced pressure glow plasma | none | none | atmospheric joining | 80° C., 10 min. | 1 | 4 |
| Embodiment 22 | reduced pressure glow plasma | reduced pressure glow plasma | none | none | atmospheric joining | none | 1-2 | 4 |

As shown in TABLE 4, the ZEONOR and the glass were able to be joined in any of the conditions of Embodiments 13-22. Under the environment having a temperature of 25° C. and a humidity of 50%, a sufficient joint strength was exhibited even after 470 hours.

As is understood from the results of evaluation of Embodiments 13 and 14, the joined structure obtained by thermal electric joining after applying a silane coupling agent to both or one of the glass and the ZEONOR had a joint strength of "1" even after the moisture resistance test. The joined structure had sufficient moisture resistance.

As is understood from the result of evaluation of Embodiment 15, in the case of applying a silane coupling agent (KBM903) to the glass, applying a silane coupling agent (KBM403) to the ZEONOR, and then performing joining under a reduced pressure, the joining strength of the obtained joined structure was "1" even after the moisture resistance test. The joined structure had sufficient moisture resistance.

As is understood from the results of evaluation of Embodiments 17 and 18, the joined structure obtained by joining under atmospheric pressure after applying a silane coupling agent to both or one of the glass and the ZEONOR, and heated at 130° C. for 10 minutes, had a joint strength of "2" even after the moisture resistance test. The joined structure had sufficient moisture resistance.

Regarding the surface treating step, it was found that any of atmospheric pressure corona plasma, atmospheric pressure glow plasma, and reduced pressure glow plasma was effective.

It is advantageous that operation under atmospheric pressure is possible at the time of joining, since it is not necessary to create a reduced pressure environment. Also, in the press-holding step, thermal electric joining (press joining by a thermal electric press) improves moisture resistance. Further, in comparison between Embodiment 15 and Embodiments 16 and 17, it is found that application of a silane coupling agent to both of the joining materials improves the joint strength. In view of the above, the manufacturing conditions of Embodiment 13 among the above-described Embodiments 13-22 are most suitable to increase the joint strength and moisture resistance.

Particularly, a favorable joined structure can be manufactured by hydrophilizing the joining materials by atmospheric pressure corona plasma, applying KBM903 to the glass, applying KBM403 to the ZEONOR, press-holding (thermal compression bonding) the treatment surfaces while keeping a temperature of 130° C., and then heat treating the joining materials at a temperature of 130° C.

Effect of the Invention

According to the manufacturing method of the present invention, various joining systems can be joined with high joint strength without using an adhesive. Further, degradation of optical properties due to an adhesive is never caused since an adhesive is not used. Moreover, joining is carried out by heating at a temperature of or below 130° C. Thus, the joining materials are not limited to those having a low softening point, that is, the joining materials which soften at low temperature, in order to succeed in joining. Degradation of optical properties of the joining materials due to high temperature over 130° C. never occurs.

If the joining medium layer is formed by a steam gas absorbing layer (water film), a joining system can be formed by forming a joining medium layer (a steam gas absorbing layer or a water film) suitable for each of the joining systems while optimizing its thickness, and then by utilizing interfacial reaction by a low temperature heat treatment of or below 100° C., even in the case of stacking and multi-layering various films. Further, the method of the present invention has flexibility of optimizing the thickness of the joining medium layer, depending on a state of the joining surfaces.

Further, the amount of reaction products and gas remaining on the joint interface in the joining step becomes small when the joining medium layer is thin. Thus, the reaction products and the gas can be easily dispersed out of the joining system in a short time after the joining step. In a currently and widely used adhesive application method, a thickness of the application layer is 10 μm to 50 μm. Thus, dispersion of an enormous amount of solvents and moisture contained in an adhesive requires 10 hours to 20 hours at low temperature. Considering that, in the present invention, the joining medium layer (steam gas absorbing layer or water film) is 5 μm or lower, usability and effect of the present invention can be well understood.

Further, the thinner the thickness of the joining medium layer is, the more the productivity is improved. On the other hand, the thicker the thickness of the joining medium layer is, the stronger the joining medium layer becomes against thermal stress.

In case that the joining medium layer is formed with a silane coupling agent, high moisture resistance can be achieved by conducting an appropriate joining process, such as thermal compression, application of a silane coupling agent to both the joining materials, a heat treatment at 130° C. for 10 minutes or longer, and so on.

Other Embodiments

In the above respective embodiments, an oxygen plasma treatment or an atmospheric corona discharge treatment is carried out in the surface treating step as examples. A plasma treatment using other than oxygen, an ozone treatment, an electromagnetic wave radiation treatment, and others may be also used.

In the joining medium layer forming step in Embodiments 1 to 12, the joining medium layer is formed on the surfaces of both the two joining materials. The joining medium layer may be formed on the surface of either one of the two joining materials.

In the joining medium layer forming step in Embodiments 1 to 22, the joining medium layer is formed from a steam gas or a silane coupling agent. Instead of a steam gas or a silane coupling agent, the joining medium layer may be formed from one or more of elements selected from a group consisting of a hydrogen gas, an alcohol gas, a hydrogen peroxide gas, and an organometallic compound. In this case, by conducting an electromagnetic wave (ultraviolet rays) irradiation treatment, together with a heat treatment or instead of the heat treatment, in the joining step, joining of the respective joining materials can be achieved. In the case that any of the hydrogen gas, steam gas, alcohol gas, hydrogen peroxide gas, and silane coupling agent is used, the heat treatment can achieve favorable joining. In the case that the organometallic compound is used, electromagnetic wave radiation can achieve favorable joining. The organometallic compound herein corresponds to an organometallic compound gas which is widely used upon thin film formation by chemical vapor deposition (CVD).

In Embodiments 1-12, the thickness of the joining medium layer is important for formation of a joined structure according to the present invention. Especially time required for reaction in the joining step, and time to remove unreacted gas, gas and others which are secondarily produced by the reaction make a significant difference in productivity of the joining process. Thus, it is desirable that the thickness of the joining medium layer is controlled to be a necessary and sufficient thickness. It is also desirable that the thickness of the joining medium layer is determined in consideration of surface roughness of the joining surfaces. Further, the joining medium layer has a function to ease/absorb a stress produced on the interface upon joining. Thus, it is desirable that the thickness of the joining medium layer is determined in consideration of irregularity of the joining surfaces, ease/absorption of the joining stress, and productivity.

In Embodiments 1-12 and 15-22, the joining materials were press-held at a pressure of 10 Kg/mm$^2$. However, a favorable joining result can be obtained in a pressure range between 0.1 Kg/mm$^2$ to 100 Kg/mm$^2$. If the joining medium layer is a water film, the thickness can be adjusted by a press-holding time and a number of times of press-holding.

In the above respective embodiments, the surface treating step was performed by an oxygen plasma treatment, an atmospheric pressure corona plasma treatment, and so on. Upon adopting the method of manufacturing a joined structure of the present invention, if the joining material already has desired properties (such as wettability, cleanliness, presence of a prescribed functional group, etc.), the joining medium layer forming step can be carried out without the surface treating step.

If joining can be achieved by the joining step without the press-holding step, or if the two joining materials are made adjacent in a different manner, the press-holding step may not be performed.

Additionally, by setting high sealing properties (sealing ability) to the joining state between the two joining materials, a joined structure can be manufactured which can inhibit entry of steam, etc. when an electronic device or the like is arranged between the two joining materials.

In the above respective embodiments, the joining materials are heated (or not heated) at a temperature between 50° C. and 130° C. in the joining step and the press-holding step. The heating temperature may be higher than 130° C. It is preferable that the heating temperature in that case is set to a temperature of or lower than a glass-transition point of the resin material as the joining material. For example, if a cycloolefin resin having a glass-transition temperature of 160° C. is used as the joining material, it is preferable that the joining material is heated at a temperature of or lower than 160° C.

What is claimed is:

1. A method of manufacturing a joined structure formed by joining two joining materials, the method comprising:
    a surface treatment step, which is a step of performing a surface treatment that improves wettability of a surface of at least one of the two joining materials;
    a joining medium layer forming step, which is a step of forming a joining medium layer by causing a steam gas to be absorbed on a joining surface of at least one of the two joining materials, such that a water volume per unit area of the joining medium layer is adjusted to a range from 0.1 g/cm$^2$ to 0.14 g/cm$^2$; and
    a joining step comprising heating the two joining materials and the joining medium layer to join the two joining materials in a state where the two joining materials are arranged one over the other via the joining medium layer.

2. The method of manufacturing a joined structure according to claim 1, wherein
    both of the two joining materials are organic compounds.

3. The method of manufacturing a joined structure according to claim 2, wherein the two joining materials are a cycloolefin resin and a polyvinyl alcohol resin.

4. The method of manufacturing a joined structure according to claim 1, wherein
    the surface treating step is a step of performing one or more of a corona treatment, a plasma treatment, an ozone treatment, and an electromagnetic irradiation treatment.

5. The method of manufacturing a joined structure according to claim 4, wherein
    the surface treating step is a step of performing a corona treatment, and
    the joining step further comprises heating for 35 minutes or longer.

6. The method of manufacturing a joined structure according to claim 1, further comprising a press-holding step, which is a step of press-holding the two joining materials arranged one over the other via the joining medium layer, posterior to the joining medium layer forming step.

7. The method of manufacturing a joined structure according to claim 6, wherein
the press-holding step is a step of heating the two joining materials while press-holding the two joining materials.

8. The method of manufacturing a joined structure according to claim 1, wherein
the two joining materials are a cycloolefin resin and a glass.

9. The method of manufacturing a joined structure according to claim 1, wherein
the two joining materials are one or two elements selected from a group consisting of a cycloolefin resin, a polyethylene terephthalate, and a glass.

10. The method of manufacturing a joined structure according to claim 1, wherein
a heating temperature in the joining step is in a range of 80° C. to 130° C.

11. The method of manufacturing a joined structure according to claim 1, wherein
the two joining materials are an organic compound and a glass.

12. A method of manufacturing a joined structure formed by joining two joining materials, the method comprising:
a surface treatment step, which is a step of performing a surface treatment that improves wettability of a surface of at least one of the two joining materials;
a joining medium layer forming step, which is a step of forming a joining medium layer on a joining surface of at least one of the two joining materials, comprising spraying a steam gas onto the joining surface and causing a silane coupling agent and water to be absorbed on the joining surface; and
a joining step comprising heating the two joining materials and the joining medium layer to join the two joining materials, in a state where the two joining materials are arranged one over the other via the joining medium layer.

* * * * *